United States Patent [19]

Bhat et al.

[11] Patent Number: 4,899,453
[45] Date of Patent: Feb. 13, 1990

[54] COMPASS WITH LED ILLUMINATION

[75] Inventors: Ramachandra K. Bhat; Janine P. Guadagno, both of Springfield; Clarence E. Duncan, Fredricksburg, all of Va.

[73] Assignee: The United States of America as represented by the Secretary of the Army, Washington, D.C.

[21] Appl. No.: 249,940

[22] Filed: Sep. 27, 1988

[51] Int. Cl.⁴ ............................................. G01C 17/10
[52] U.S. Cl. ....................................... 33/348; 33/272
[58] Field of Search ................... 33/355 R, 348, 272, 33/364

[56] References Cited

U.S. PATENT DOCUMENTS

| | | | |
|---|---|---|---|
| 2,487,044 | 11/1949 | Cude | 33/348 |
| 2,803,068 | 8/1957 | Mason | 33/348 |
| 3,502,857 | 3/1970 | Cleveland | 33/348 X |
| 3,613,251 | 10/1971 | Fitzpatrick | 33/270 |

Primary Examiner—Harry N. Haroian
Attorney, Agent, or Firm—Anthony Lane; John Becker; Charles Miller

[57] ABSTRACT

A magnetic compass is illuminated by a light emitting diode. The compass is enclosed in a case made of a lightweight, plastic composite material. The light-emitting diode is energized by a low profile, nonmagnetic battery connected to the light emitting diode through a nonmagnetic microswitch operated on the exterior of the casing by a pushbutton. The compass has a compass rose with strips of phosphorescent material disposed thereon, a rotatable bezel with a strip of phosphorescent material thereon and a lid having a sighting slot therein traversed by a cross hair. Located at the bottom and top of the cross hair are additional strips of phosphorescent material so that the compass may be utilized in the dark. The phosphorescent material may be charged by ambient light and by light emitted by the light emitting diode.

20 Claims, 5 Drawing Sheets

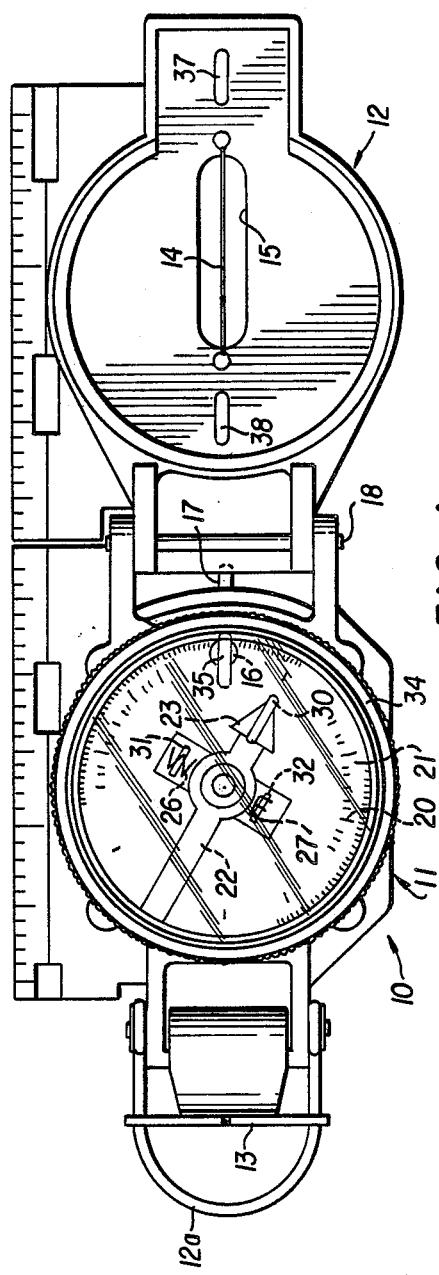
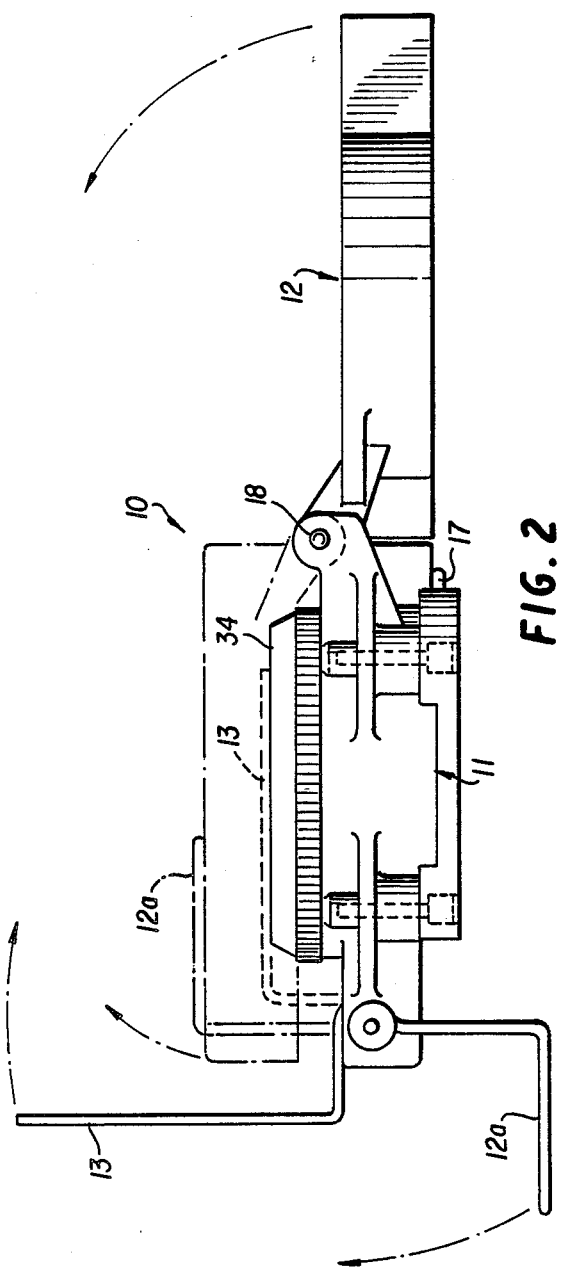

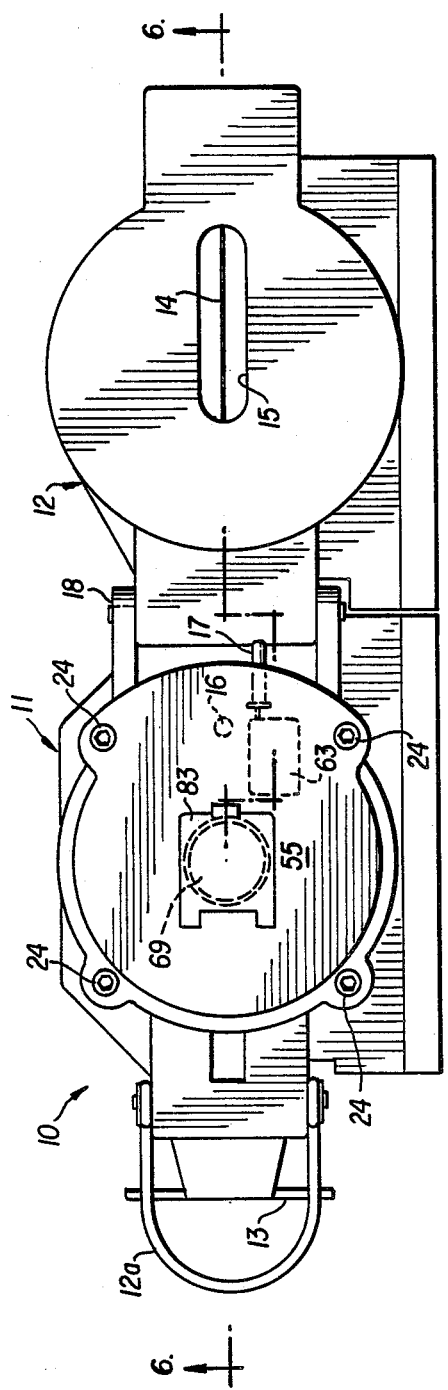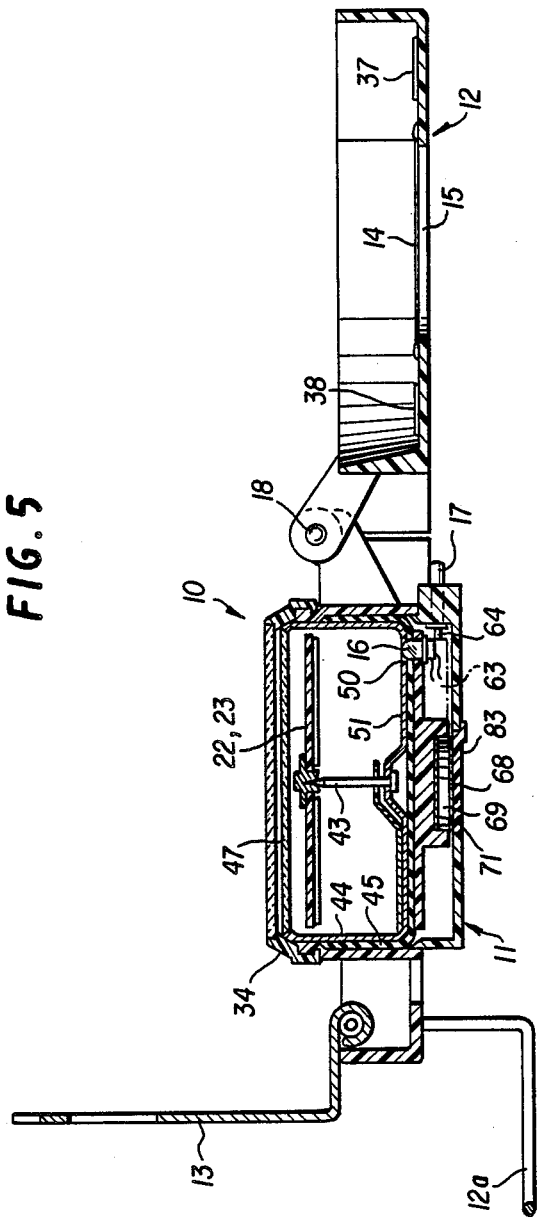

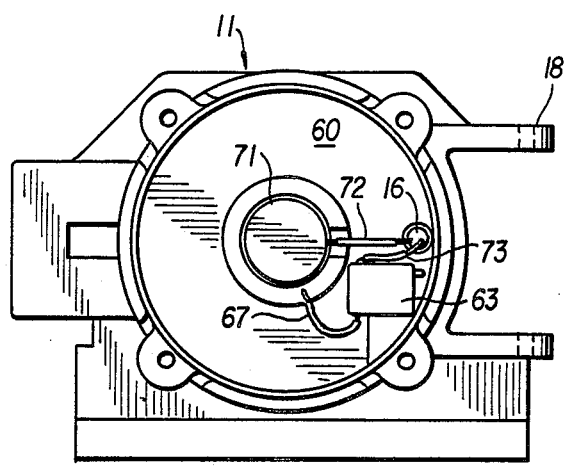
FIG.7
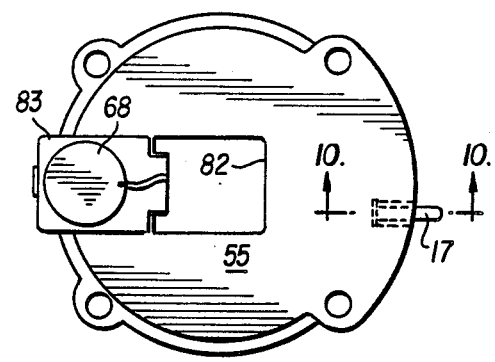
FIG.8
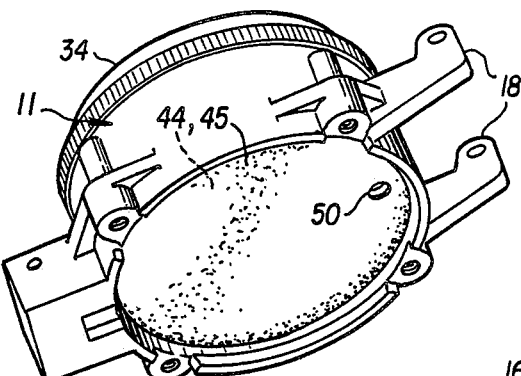
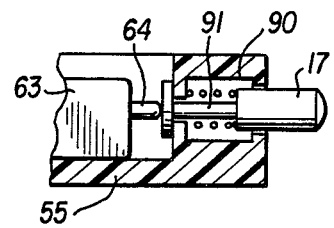
FIG.10
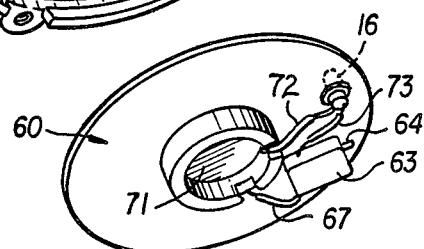
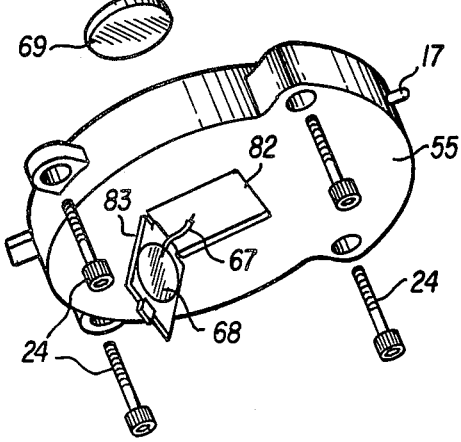
FIG.9

COMPASS WITH LED ILLUMINATION

GOVERNMENT INTEREST STATEMENT

The invention herein may be used by the U.S. Government for governmental purposes without the payment of any royalties therefor.

BACKGROUND OF THE INVENTION

The present invention relates generally to dial illumination means which can be used with compasses and is more specifically directed to an improved compass illuminating arrangement utilizing a miniature electrical battery in circuit with a light-emitting-diode (LED) for illuminating the bezel/dial of lensatic magnetic compasses such as the type made by Stocker-Yale Company of Beverly, Mass. That company supplies a magnetic type compass to the U.S. Army, which compass is differently illuminated but whose basic components are governed by the Military Specification MIL-C-10436L and is further identified by a national stock number NSN 6605-00-151-5337.

Presently, all of the U.S. Army lensatic magnetic compasses are illuminated by a plurality of usually seven radioactive tritium-excited phosphor tubes containing a total of approximately 120 millicuries of the tritium gas which has a half-life of 12.26 years. Although the quantity and type of radiation is not harmful, unless taken internally, the problem and disadvantages thereof reside in the cost of handling or processing the old and/or broken compasses for burial of the tritium vials or tubes, and the attendant time and expense of procuring replacement compasses. Presently, the tritium tubes or vials housed within the compass cases last about six years and must be shipped to a radioactive burial ground for disposal, with no present cost-effective means for salvaging or repairs of defective parts. Thus the government is forced to spend between $200,000 and $300,000 annually for their disposal and approximately another $2.5 million annually to procure 100,000 new compasses.

By redesigning the lensatic compass according to the present invention with the unique placement of the non-radioactive and non-magnetic LED illuminating means in a manner which will facilitate cost-effective replacement of defective or damaged parts, the aforestated problems are overcome whereby many of the original compasses will become repairable and can be recycled back into service at a great savings of man-hours and related costs.

The current existing form of lensatic magnetic compass generally is a well constructed sturdy instrument which is simple to use. However, the majority of the returned compasses for disposal are caused by mechanical failures or breakage of lens brackets, immobilized dials and broken crystal bezels much of which result from improper soldier handling attributable to excessive forced openings and closings. A lot of the breakage could be prevented with greater pre-use instruction, and most of the mechanical failures could be repaired if sent to a properly instituted and staffed compass repair center where they could be properly screened, repaired and recycled. More particularly a redesigned type of compass with a modified ultra light case embodying the present innovative generally central location of a readily replaceable non-magnetic miniature wafer battery, a non-magnetic LED, and non-magnetic microswitch, thereby eliminating the tritium tubes and related radioactive costly disposal and repurchasing problems and expense, not only would provide an even sturdier and lighter weight compass less susceptible to damage, but one which could be more easily and cost effectively repaired and recycled.

Considering the prior art more particularly, the use of incandescent bulbs to light compasses is, of course, old in the art as is exemplified by patents such as U.S. Pat. Nos. 2,738,412; 3,786,571; and 4,341,023. In each of these patents, the incandescent bulb is energized by an external more substantial electrical power source connected thereto by a power line. A soldier in the field, of course, does not have such power sources available to him. Moreover, incandescent bulbs tend to be somewhat unreliable under field conditions in that they are susceptible to shock damage primarily due to the rough treatment that any equipment receives in the field as well as to the hazards of proximate explosions. U.S. Pat. No. 2,237,963 discloses a compass in combination with a flashlight, wherein a compass is illuminated by a separate bulb powered by the batteries of the flashlight. Again, the bulb disclosed is an incandescent bulb with the attendant disadvantages of an incandescent bulb. In addition, the batteries are standard flashlight batteries which have magnetic properties and can deflect the compass needle or compass rose from true North. Almost all incandescent bulbs emit too much light, require excessive current and must be shielded, filtered or otherwise modified so as to be used effectively with military field compasses.

U.S. Pat. No. 4,115,994 discloses the concept of utilizing a light emitting diode to illuminate the dial of a wrist watch; however, this illumination is not suitable for a military compass in that it presents an extensive illuminated area which can interfere with night vision as well as possibly pinpoint the user as a target.

The present lensatic compass used by the Army uses the aforesaid tritium excited phosphor gas tubes or vials which suffer not only the aforementioned disadvantage of disposal problems and replacement cost, but also lose their luminosity prematurely with age. Additionally, the dial and markings are often difficult to see at night due to low luminosity.

In view of the aforementioned considerations, it is seen that there is a need for a military compass which does not have the numerous drawbacks inherent in compasses of the prior art.

OBJECTS AND BRIEF SUMMARY OF THE INVENTION

It is an object of the present invention to provide a new and improved compass which is especially useful as a military compass wherein a light source not having the deficiencies of a tritium vial light source is utilized.

It is a further object to provide such a compass which also uniquely embodies a light emitting diode, hereinafter designated diode or LED, a thin wafer style battery and a finger-operated microswitch, all of which are of unique non-magnetic character.

A still further object is to provide an improved compass according to the foregoing objects which further are operatively integrated in a very lightweight composite plastic material case having a conventional hinged top cover to reveal the compass rose and needle, and a smaller hinged bottom access plate to facilitate battery replacement when necessary.

Upon further study of the specification and appended claims, further objects and advantages of this invention will become apparent to those skilled in the art.

In view of these and other objects, the instant invention is directed to a new and improved compass having a dial at least a portion of which is illuminated by at least one light emitting diode. The compass includes a case of nonmagnetic impact-resistant, light weight material having a compartment therein for receiving a nonmagnetic battery which is readily replaceable upon being expended. Phosphorescent indicia are placed at a plurality of locations on the compass, the phosphorescent indicia being energized by the diode and supplementally by any substantial exposure to ambient light so as to glow visibly under night conditions. Preferably, the phosphorescent indicia are in the form of short lines and are positioned in locations indicative of true North, East and West on the compass rose; on the rotatable bezel which overlies the compass rose and at the top and bottom of a sight wire and aperture through a hinged lid which covers the compass when not in use.

In a more preferred embodiment, the diode is preferably placed at the "front" of the compass in a 12 o'clock position, and in alignment with the aforesaid phosphorescent strips on the hinged cover.

The compass body preferably is made of a nonmagnetic composite resin material which is very light in weight and resistant to shock and moisture. The new composite material may be of a type manufactured by Deutsch Co. of San Jose, CA, and will provide a compass housing which is about one-half the weight of the current case. The switch for activating the light is preferably a single pushbutton operated microswitch located at the front central portion of the compass and connected directly to a pair of copper contact plates between which the wafer battery is sandwiched. One of the contact plates is attached to an access cover plate which snaps over and secures the nonmagnetic battery within the lower half of the compass case. The nonmagnetic battery is preferably a low profile battery so that the external dimensions and configuration of the compass case can remain substantially the same as those of the currently used compass. The pushbutton microswitch connecting the battery to the LED has a spring-projected pushbutton extending from a generally medial portion of the front of the compass case and arranged so that when depressed, the LED is energized and when released, the LED is de-energized. It is to be understood that a switch means can be used which when activated will remain on until selectively non-activated.

Each of the above recited features, both alone and in combination, results in a new and improved lighter weight compass having more advantages than those of the currently used tritium illuminated compass while essentially eliminating the disadvantages inherent in the tritium illuminated compass.

BRIEF DESCRIPTION OF THE DRAWINGS

Various other objects, features and attendant advantages of the present invention will be more fully appreciated as the same becomes better understood when considered in conjunction with the accompanying illustrative drawings, in which like reference characters designate the same or similar parts throughout the several views, and wherein:

FIG. 1 is a top plan view of a compass configured in accordance with the principles of the instant invention, with its cover in an open configuration;

FIG. 2 is a side elevational view of the compass of FIG. 1 also with the cover in an open configuration, and also showing the closed configuration of the cover and other components in broken phantom lines;

FIG. 5 is a bottom view of the compass with portions in phantom;

FIG. 6 is a longitudinal cross-sectional view of the compass taken approximately along line 6—6 of FIG. 5;

FIG. 7 is a bottom view of the compass with the back or bottom cover removed;

FIG. 8 is a bottom view of the removed back cover of the compass;

FIG. 9 is a perspective exploded view from below of the compass showing the electrical components thereof;

FIG. 10 is an enlarged cross-sectional detail view through a portion of the back cover showing the configuration of a pushbutton for operating a microswitch which controls the light emitting diode;

DETAILED DESCRIPTION OF PREFERRED EMBODIMENT

Figure 3:
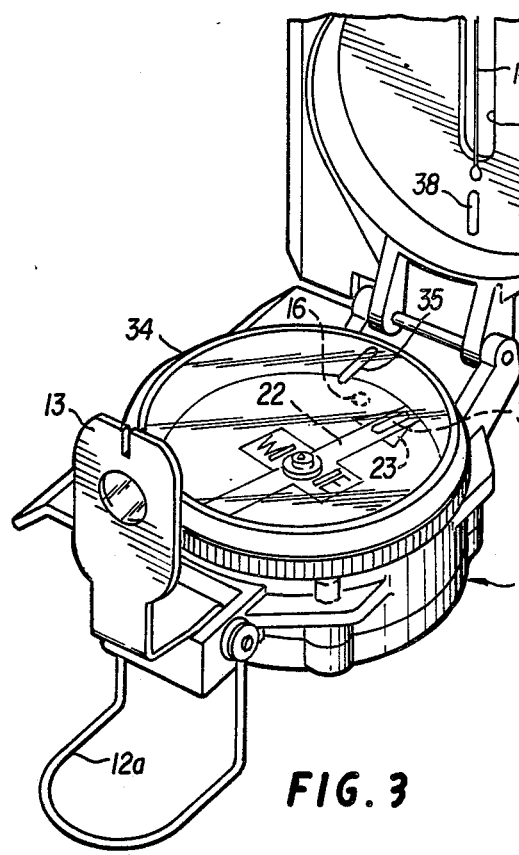
FIG. 3 is a perspective view of the compass of FIGS. 1 and 2 with the lid and sighting glass raised for use.

Referring now to FIGS. 1-3, there is shown a magnetic compass, designated generally by the numeral 10, which is enclosed in a case, designated generally by the numeral 11 by a lid, designated generally by the numeral 12. The case 11 and lid 12 are made from a lightweight, plastic composite material which is moisture proof and impact resistant. The compass 10 is in compliance with current military specifications and is referred to in those specifications as a lensatic luminesce-dial, induction damped, compass having five degree and 20-mil graduations enclosed in a carrying case. The compass 10 uniquely includes a light emitting diode (LED) light source 16 in lieu of using tritium tubes, so that the entire compass does not have to be disposed of at the end of 3-5 years, as is the case with said tritium vial illuminated compasses. The LED preferably used in conjunction with a plurality of phosphorous markings to be described hereinafter. The LED is powered by a low profile, uniquely nonmagnetic replaceable battery which eliminates the need for any radioactive light source.

In FIG. 3, the compass 10 is shown in its open sighting mode with the lid 12 extending perpendicular to the case 11 with a sighting glass 13 pivoted from over the compass and to extend perpendicular to the case. In use, the user looks through the sighting glass 13 while aligning a cross-hair 14 extending vertically across an open slot 15 in the cover 12. As will be explained hereinafter, an LED 16 is positioned within the compass 10 so as to illuminate at least that portion of the dial in general alignment with the line of sight so that the compass 10 may be effectively used in the dark. Generally, the compass 10 is held in one hand stabilized by the user's thumb being inserted through the pivotal bail element 12a to engage and support the case 11, in conjunction with finger tip support, and with the user's index finger engaging an LED operating pushbutton 17, (FIGS. 1 and 10) positioned preferably generally centrally in the case 11 adjacent the hinge means 18 of the cover 12 so as to allow for convenient illumination of the compass.

Referring now more specifically to FIGS. 1 and 3, there is shown a compass rose or dial, designated generally by the numeral 20, which comprises a transparent plastic disk having directional indicia 21, expressed in degrees and radians disposed adjacent its periphery. A compass needle in the form of a bar magnet 22 aligned along the 0° and 180° radians of the compass rose and has an arrow indicator 23 thereon which is oriented to point in the North direction by the of the compass rose bar magnet. Extending perpendicular to the needle bar magnet 22 are a pair of lateral indicators 26 and 27 which have a "W" and a "E" indicia thereon respectively indicative of East and West on said compass rose, apart from the normal compass points and aforesaid graduated indicia.

Adjacent the indicators 23, 26 and 27, there are strips of phosphorescent paint 30, 31 and 32, respectively, which when charged by the LED 16, glow in the dark. The strips of paint may be placed within recessed grooves which formerly received the tritium tube in the current production model of the army compass. Positioned over the compass rose is a transparent plastic bezel 34 which also has a strip 35 of phosphorous paint better seen in FIGS. 1 and 3. The bezel 34 is rotatable on the case 12 independent of the compass rose 20 and a transparent plate 47 herein after described.

The lid 12 has upper and lower strips of phosphorous paint 37 and 38 positioned at opposite ends of and aligned with the cross hair 14 which extends across the sighting slot 15. Each of the six phosphorescent paint strips 30, 31, 32, 37 and 38 may alternatively be tubes or vials of phosphor material which continues to phosphoresce in the dark after being exposed to light.

In accordance with the instant invention, the light emitting diode (LED) 16 is positioned more preferably at 12 o'clock beneath the transparent compass rose 20 on a line with which the cross hair 14 and phosphor paint strips 37 and 38 are in alignment. The LED 16 is bright enough to both illuminate that portion of the compass rose 20 adjacent the LED so that the indicia 21 may be read at night and emits sufficient light to charge the strips of phosphorescent material 30, 31, 32, 35, 37 and 38.

The circuitry for the LED as designed for army usage contemplates the use of a resistance 39 (FIGS. 11-14) so as to preferably limit the degree of illumination to 200 micro Lamberts. This is because greater illumination will tend to not only divulge the user's location but also tend to destroy or otherwise impair the users acquired night vision. For non-military use, the degree of illumination may be greater and varied according to other variable factors.

Figure 4:
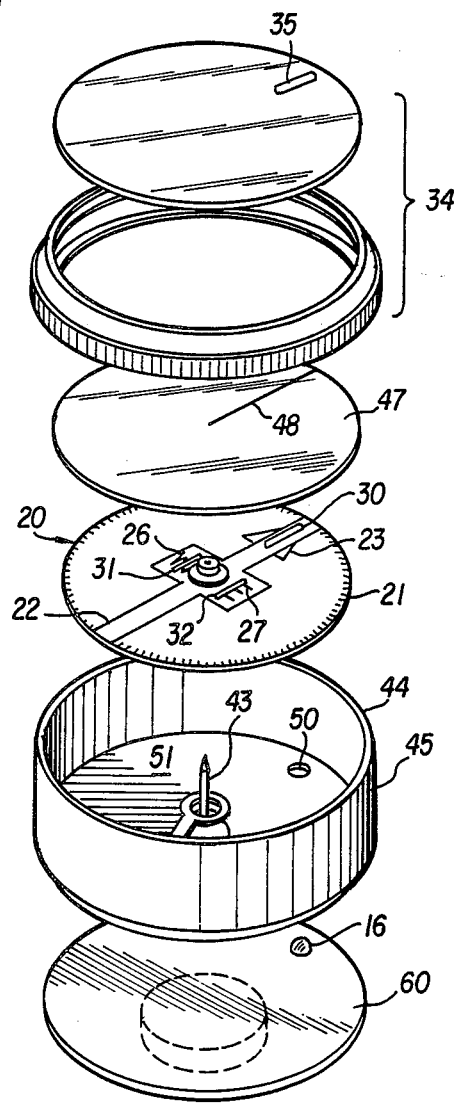
FIG. 4 is an exploded perspective view of portions of the compass removed from the case of the compass.
Figure 11:
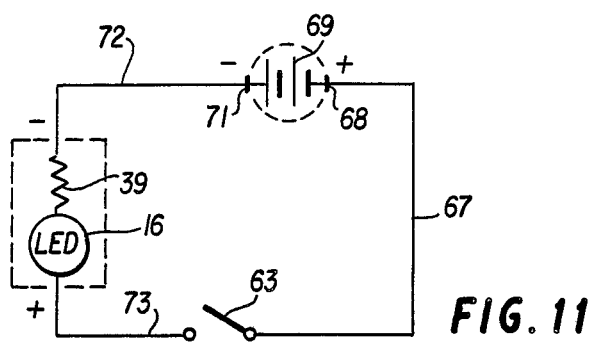
FIG. 11 is a circuit diagram of a first embodiment of the invention with an LED having a tiny resistor integral therewith.
Figure 12:
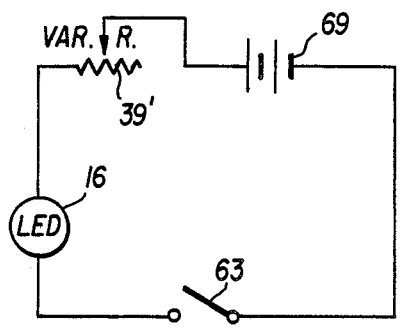
FIG. 12 is a circuit diagram of a second embodiment of the invention wherein the LED has a variable resistor in series therewith.
Figure 13:
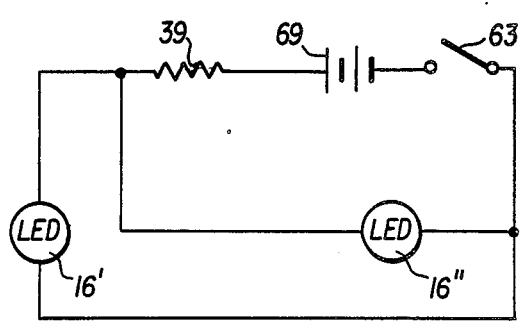
FIG. 13 is a circuit diagram of a third embodiment of the invention wherein there are a pair of LEDs, position at the front and rear of the compass bowl.
Figure 14:
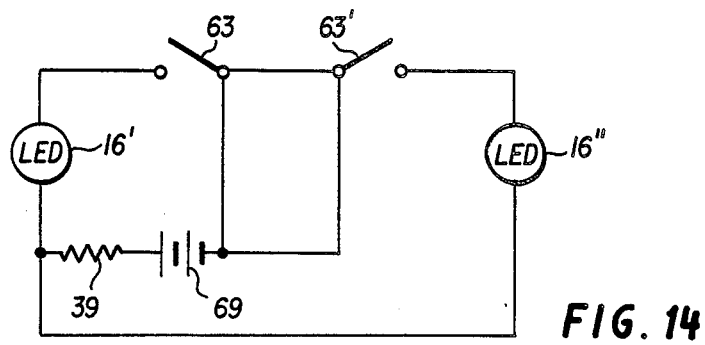
FIG. 14 is a circuit diagram of a fourth embodiment of the invention wherein there are a pair of LED's each controlled by a separate switch.

Referring now to FIGS. 4 and 6, it is seen that the compass rose 20 rests on a support pivot 43 which projects from the bottom of a compass bowl or cup 44. The cup 44 is made of copper with its interior surfaces painted white. A rubber covering 45 surrounds the exterior of the cup 44 so as to protect the cup from water intrusion by sealing with the inner surface of the case 11. The rubber covering 45 sealingly abuts a circular, transparent plastic bowl-covering plate 47 which has a lubber line 48 thereon which is aligned in a northerly direction with the cross hair 14 on the lid 12.

As is better seen in FIGS. 7-9, the cup 44 has a recess 50 through the bottom thereof which receives the diode 16. The top of the diode 16 is preferably positioned generally flush with the inside surface 51 of the bottom of the cup 44 or only slightly above so as to not mechanically interfere with the rotation of the compass rose 20, and more particularly when subjected to between about 8 to 10 degree tilt in operative use.

Referring now to FIGS. 7 and 9, which shows the compass 10 with the back portion 55 of the case 11 removed, it is seen that the electrical components are each mounted on a mounting plate 60 which is adhered or otherwise attached to the back of the cup 44 in abutment with the rubber covering 45 which covers the cup. The LED 16 is preferably mounted on the mounting plate 60 and projects through the hole 50 in the bottom of the cup 44 so as to be visible from above. Mounted on the mounting plate 60 is a nonmagnetic microswitch 63 which has an activator 64 projecting therefrom that is aligned with and operated by the pushbutton 17. The nonmagnetic microswitch 63 has its negative terminal pin attached by a nonmagnetic lead 67 to a copper plate 68 which serves as the top contact plate for nonmagnetic battery 69. The preferred wafer battery has the opposite faces serve as the respective positive and negative terminals. The flat nonmagnetic battery 69 abuts a second copper plate 71 secured to the mounting plate 60. A lead 72 from the bottom contact plate 71 is attached to the negative lead of the diode 16 while the positive lead of the diode 16 is attached by lead 73 to the positive terminal or pin of the microswitch 63.

The use of a resistance 39 would preferably occur in lead line 72 between the negative terminal of the battery 69 and the LED 16. The resistance is of a predetermined value so as to achieve the desired limitation of the degree of illumination. It is contemplated that the resistor 39 may be integrated with the LED, or in alternative embodiments may be a separate variable type resistor which can be manually adjusted from outside of the casing.

As is seen in FIG. 9, the back portion 55 of the case 11 is secured to the case 12 by four screws 24. The back part 55 has an opening 82 therein which is aligned with the bottom copper contact plate 71 on which the battery 69 rests. Pivoted adjacent one edge of the opening 82 is a panel 83 which shuts the opening with means to seal the battery 69 within the case 11. The top copper contact plate 68 is adhered to the pivoted panel 83 and urged into contact with the battery 69 when the panel 83 is shut to close the opening 82. The panel 83 has a tight interference fit or other sealing means with the periphery of the opening 82 so as to minimize the possibility of moisture coming into contact with the battery 69. Alternatively, the cover plate 83 can be threaded into the back panel 55 with a seal positioned adjacent its periphery and urged into abutment with the side of the opening in the manner of a water proof watch.

As is seen in FIGS. 8 and 10, the compass bottom or back portion 55 has an edge bore 90 therein which receives a shank portion 91 of the push button 17. A coil spring 92 which also is nonmagnetic urges the pushbutton 17 outwardly so as to project laterally from the back portion 55 and thus from the casing 12 of the compass 10. The end of the shank 91 is aligned with the projecting activator 64 of the microswitch 63.

The electrical components of the compass 10 are each nonmagnetic components so as to not effect the orientation of the compass rose 20 as determined by the bar magnetic 22 mounted thereon. In a preferred embodiment of the invention, the following electrical components are used and represent some examples of generally commercially available items:
1. The battery 69—nonmagnetic lithium/manganese dioxide battery from Duracell Model No. DL 1220 having an approximate thickness of 0.079 inches and a diameter of about 0.492 inches.
2. Light emitting diode 40—nonmagnetic diode with an implanted non-magnetic resistor preset to a predetermined value, and with nonmagnetic leads available from Aborn Electronics, Inc. of San Jose, Calif.
3. Composite material for case-light weight plastic composite material available from the Deutsch Engineered Connecting Devices Company located in Springfield, Pa.
4. Microswitch—sold by Powell Electronics of Columbia, Md.

Alternative Embodiments

While the foregoing description is for a preferred embodiment, other embodiments are and have been contemplated, including the similar incorporation of the LED with related circuit and switch means in conjunction with other types of compasses. Among the contemplated modifications are the incorporation of plural LEDs, plural small wafer type batteries or the like, and plural switch means with or without the variable resistance means embodied in the LED means, such as depicted in FIGS. 11–14. These representative figures include similar reference characters as used in the description of the foregoing embodiment. Some of the reference characters may be primed for alternative embodiments.

Alternative Embodiment Test Data

Several alternate embodiments for the LED lensatic compass were investigated.

Test 1

To determine the amount of influence the components of the LED lensatic compass would exert on the magnetic needle and its subsequent detection of north.

A magnetic needle was removed from the lensatic compass and mounted upon a nonmagnetic pin so that it would be free moving. The battery, diodes, resistor, microswitch and connecting wire to be used in the compass were waved in front of the needle. A deflection or attraction of the needle to the component would mean the component affected the needle. The ordinary battery greatly attracted the needle as did the diodes which had ferrous leads. The resistor, microswitch, connecting material and diodes of nonferrous material had no influence on the movement of the needle.

As a result of this test, it was concluded that the components of the LED compass must be made of nonmagnetic material so as not to affect the performance the needle in the detection of true north. The performance of the compass is adversely affected by the use of components made of magnetic material and the type of material is a major factor in the consideration of components for the compass.

Test 2

To determine the amount of electrical field generated by the activation of a diode.

It was suggested that the diodes when activated would generate an electrical field that would have to be cancelled to prevent an adverse on the performance of the magnetic needle in the detection of north. By placing the diodes in a concentric circle or in a central location, the electrical field thought to be generated by the activation of the diode would be cancelled. To be sure the battery, which was magnetic, was not influencing or adding to the effect of the activated nonmagnetic leads diode, the leads of the nonmagnetic diode were soldered to two feet of nonmagnetic wire which was then connected to the battery located two feet from the magnetic needle set-up. A magnetic needle was removed from a lensatic compass and mounted on a nonmagnetic pin so that was free moving. The diode was then activated and waved in front of the magnetic needle. The needle was not deflected.

As a result of this test it was concluded that the activation of a nonmagnetic diode does not generate an electrical field which will influence the performance of the magnetic needle in its detection of north. The placement of the diodes to cancel the generation of an electrical field is not considered to be an important factor in the determination of diode placement.

Test 3

To determine if a shielding material was available to shield the magnetic components of the LED compass from the magnetic needle thereby eliminating the need for nonmagnetic parts such as batteries, diodes, wires, etc., various shielding manufactures and material experts were consulted as to the location of shielding material. The following possibilities were presented:

Use of silicon as shielding-tests results showed this to be ineffective in shielding the attraction of the battery to the magnetic.

Use of mu metal-tests results showed this to be effective in shielding the attraction of the battery to the magnetic, however, it itself attracted the magnetic and was therefore, ineffective as a shielding material.

Use of plastics and resins as shielding-tests showed these to be ineffective in shielding the attraction of the battery to the magnetic.

Orientation of the battery in different planes in respect of the magnetic needle-tests results showed that some perpendicular arrangements of the battery to the needle did dampen the attraction, but no arrangement entirely cancelled the attraction. Therefore, the orientation of the battery to the needle was not an effective shielding technique.

As a result of this test, it was concluded that magnetic components would have to be avoided for use in the LED lensatic compass in conjunction with a magnetic needle.

Test 4

Location of the diode and battery on top of the bezel as opposed to the bottom of the case.

Research into the existence of nonmagnetic batteries could not locate the existence of a nonmagnetic battery that could fill the size restraints to be placed on top of the compass. Field soldiers, when question on the optimal placement of the diode and its activation, stated that a light on the front bezel would require awkward activation and partial blockage of the field of view when activated. The placement of a magnetic battery on the bezel was found to have intolerable interference on the performance of the needle in the detection of true north.

Test 5

Location of nonmagnetic LEDs in the base of the compass at position other than 12 o'clock.

Alternate position locations of the nonmagnetic diodes in conjunction with a nonmagnetic battery were found to be acceptable, however a use of a plurality of diodes shortened the life of the battery without significant improvement of the performance.

It is apparent from the foregoing detailed description that a greatly improved lightweight and novelly illuminated magnetic compass has been evolved which satisfies the aforestated objectives and advantages.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A magnetic compass comprising:
   a compass rose having a periphery with an array of indicia, indicative of direction disposed therearound;
   a compass bowl or cup of nonmagnetic material having a pivot projecting therefrom on which the compass rose is supported for free rotation thereon, the cup having transparent cover disposed thereover to enclose the compass rose, the cup having an opening through the bottom thereof;
   a case of nonmagnetic material having a bottom and a top and a cavity therein for receiving said cup; the said top of the case constituting a pivoted lid with a sighting slot therein for sighting the compass, the lid slot having a sighting cross hair extending therethrough;
   the case further having a back plate for closing an access aperture in the bottom of the case;
   a rotating bezel overlying the transparent cover of the cup and enclosing the top of the case beneath the hinged lid;
   a light emitting diode disposed in the opening through the bottom of the cup;
   a battery for energizing the light-emitting diode disposed between the back plate of the case and the bottom of the cup;
   switch means disposed between the back of the plate and the cup, the switch means having one lead connected to one pole of the battery and another lead attached to one lead of the light emitting diode, the other lead of the light emitting diode being connected to the other pole of the battery, and
   external activating means accessible from the exterior of the case for operating the switch to energize the light emitting diode with the battery, and
   wherein the battery, light emitting diode, switch and activating means are all of nonmagnetic character.

2. The compass of claim 1, wherein the compass rose includes phosphorescent material disposed on the East, West and North positions of the rose.

3. The compass of claim 2, wherein phosphorescent material is positioned on the rotating bezel and phosphorescent material is positioned on the inner surface of the lid above and below the cross hair and in alignment with the cross hair.

4. The compass of claim 3, wherein the transparent cover plate of the cup has a lubber line aligned with a single radiant thereon, which lubber line is in alignment with the hole through the bottom of the cup and lies in the same vertical plane that includes the cross hair in the lid.

5. The compass of claim 1, further including a mounting plate attached to the back of the bottom of the cup for mounting the battery and microswitch on one side thereof and the light emitting diode on the other side thereof.

6. The compass of claim 5, further including a bore through the back plate of the case and wherein the activating means for the switch is a spring-projected plunger which extends through the bore and projects beyond the back plate so as to be conveniently positioned for finger operation.

7. The compass of claim 6, wherein the plunger projects from the back plate at a position adjacent the hinge for the lid.

8. The compass of claim 1, further including a resilient water proof covering surrounding the copper cup for substantially precluding intrusion of water into the cup.

9. A compass comprising:
   a compass rose, the compass rose having an array of indicia around the periphery thereof and a bar magnet thereon, the indicia including indicia aligned with the bar identifying the direction "North" and indicia disposed at 90° to the magnetic bar identifying the directions "East" and "West", phosphorescent material disposed at the indicia identifying the North, East and West directions, the compass rose having a bearing surface at the center thereof;
   a copper cup having a bottom wall with an inner and outer surface and a circular side wall, the copper cup having an interior surface defined by the bottom and side walls which is colored white, the copper cup having an outer surface defined by the side walls and back of the bottom wall which is covered with a resilient water proof covering,
   a pivot projecting from the center of the cup upon which the compass rose centrally bears retained for free rotation, the cup having an opening through the bottom thereof adjacent the side wall thereof for receiving a light emitting diode and a transparent plastic covering for the cup, the plastic cover having a lubber line thereon aligned with the opening and the plastic cover enclosing the compass rose within the plastic cup;
   a compass case for receiving the copper cup with the compass rose enclosed therein, the case including a lid attached thereto by a hinge which is adjacent the opening through the cup when the cup is received within the case, the hinged lid including an opening therethrough having a cross hair extending therein in alignment with the light emitting diode opening in the cup, the lid having phosphorescent strips on the inside surface thereon adjacent opposite ends of the cross hair, the case further having a back which is attached to the case in spaced relation to the back surface of the cup when the cup is mounted in the case;

a bezel with a phosphorescent strip adjacent the periphery thereof, the bezel being rotatably mounted on the casing between the casing and the lid when the lid is closed;

a mounting plate secured to the back of the cup, the mounting plate having a front surface in engagement with the cup and a back surface facing the back plate of the case;

a light emitting diode mounted on the mounting plate and aligned with the opening in the cup, the light emitting diode projecting into a lower part of the cup closely adjacent the bottom of the cup so as not to interfere with the rotation of the compass rose, more particularly when the compass is tilted between about 8 and 10 degrees relative to a horizontal plane;

a microswitch disposed on the back side of the mounting plate, the switch having a projecting activating plunger and at least a pair of terminals;

a first contact plate on the back surface of the mounting plate, the first contact plate having a configuration suitable for contacting one pole of a battery;

a second contact plate having a configuration for contacting another pole of a battery;

a openable panel a recess through the back panel of the case, the second contact plate being mounted on the inside surface of the cover;

nonmagnetic lead means connecting switch and contact plates to the light emitting diode;

a low profile, nonmagnetic battery received between the contact plates and enclosed in the case upon closing the panel for energizing the light emitting diode upon actuation of the plunger projecting from the microswitch;

a bore extending radially through the back plate of the casing and opening both inside the casing and outside the casing, and a spring-projected pushbutton extending through the bore and projecting outside the case for finger engagement whereby the compass is illuminated by the light emitting diode upon pressing a push button.

10. In a compass of the type comprising a casing means of nonmagnetic material which casing carries a generally liquid resistant compass bowl of non-magnetic material, a bowl-carried rotatable compass rose and with radian and degree directional indicia thereon, a transparent plate overlaying the compass bowl, and a means on said compass rose card for detecting a north direction, the improvement comprising:

(a) illumination means of a light emitting diode (LED) type including at least one LED mounted in association with said compass bowl and casing so as to illuminate at least part of said compass rose card when the LED is energized;

(b) miniature power source means and electrical circuit means operatively disposed in said casing including conductor lead means operatively disposed in said casing including conductor leas means interconnecting said LED and power source means;

(c) switch means interposed in said circuit means so as to effect selective energizing and deenergizing of said LED to provide illumination by which to read the compass under darkened and night time conditions; and (d) wherein said LED, miniature power sourch means, circuit and switch means are all of a nonmagnetic character so as to avoid adverse deflection of said north direction detecting means and erroneous reading thereof.

11. The compass of claim 10, wherein said compass rose card is of transparent non-magnetic material mounted on a bowl-associated pivot means, said LED is mounted in a lower portion of said bowl beneath said compass rose card in a spaced relation manner to assure non-physical interference between said compass rose card and said LED when said compass casing means is tilted between approximately 8 to 12 degrees relative to a horizontal plane.

12. The compass of claim 10, wherein said LED is mounted so as to project only slightly into said compass bowl at about a 12 o'clock position, means for replaceably mounting said miniature power source means in a lower portion of said casing means, and said switch means includes a microswitch disposed also in a lower portion of said casing means between about the eleven o'clock and one o'clock positions in close association with the LED, said switch means also including a fingeroperable switch-activating plunger means protruding from said casing means adjacent said microswitch to facilitate ambidextrous hand finger activation of said switch means.

13. The compass of claim 10, wherein said miniature power source means includes at least one low profile wafer type battery, and said switch means includes a miniature microswitch.

14. The compass of claim 10, wherein said circuit mean includes a resistor means of a predeterminable value to limit the amount of LED illumination.

15. The compass of claim 10, wherein said circuit means includes an adjustable type resistance means or rheostat which can be adjusted to vary the degree of LED illumination.

16. The compass of claim 10, wherein said LED includes an integrated resistance of predetermined value to limit the degree of illumination.

17. The compass of claim 10, wherein said casing is basically constituted by a bottom case member and a hinged cover lid, and said compass further includes an annular rotatable collar with superposed transparent view plate which together with said collar member constitutes a rotatable bezel member with means for rotatably mounting said bezel member on an upper edge of said bottom case member; and phosphorescent line indicia means on said transparent viewing plate positioned so as to be viewable during use in sighting of said compass.

18. The compass of claim 17, wherein said bottom case member is fabricated so as to define cavity areas in which said miniature power source means is removably disposed along with said related circuit means and openable-closable cavity covering means over said miniature power source near it in said casing.

19. The compass of claim 18, wherein said power source means is a low profile wafer type miniature battery and wherein said circuit means includes a pair of battery contact plate members of which at least a portion of one member is disposed on said cavity covering means.

20. The compass of claim 10, wherein said compass rose card is provided with a plurality of phosphorescent indicators including north, east and west indicia.

* * * * *